US012759430B2

(12) United States Patent
Kano et al.

(10) Patent No.: US 12,759,430 B2
(45) Date of Patent: Oct. 13, 2026

(54) VEHICLE, PREDETERMINED FACILITY, AND PROCESSING SYSTEM

(71) Applicant: TOYOTA JIDOSHA KABUSHIKI KAISHA, Aichi-ken (JP)

(72) Inventors: Sa Kano, Aichi-ken (JP); Takuji Matsubara, Aichi-ken (JP); Osamu Yumita, Aichi-ken (JP); Naoki Hasegawa, Aichi-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 105 days.

(21) Appl. No.: 18/415,650

(22) Filed: Jan. 18, 2024

(65) Prior Publication Data

US 2024/0246453 A1 Jul. 25, 2024

(30) Foreign Application Priority Data

Jan. 20, 2023 (JP) ................................ 2023-007450

(51) Int. Cl.

| | |
|---|---|
| ***B60L 58/24*** | (2019.01) |
| ***B60L 55/00*** | (2019.01) |
| ***H01M 10/613*** | (2014.01) |
| ***H01M 10/615*** | (2014.01) |
| ***H01M 10/625*** | (2014.01) |

(52) U.S. Cl.

CPC ............... *B60L 58/24* (2019.02); *B60L 55/00* (2019.02); *H01M 10/613* (2015.04); *H01M 10/615* (2015.04); *H01M 10/625* (2015.04); *H01M 2220/20* (2013.01)

(58) Field of Classification Search

CPC .......... B60L 58/24; B60L 58/25; B60L 58/26; B60L 58/27; H01M 10/61; H01M 10/613; H01M 10/615; H01M 10/625

See application file for complete search history.

(56) References Cited

U.S. PATENT DOCUMENTS

| | | | | |
|---|---|---|---|---|
| 2016/0288659 | A1* | 10/2016 | Hammoud | B60L 1/02 |
| 2021/0376402 | A1* | 12/2021 | Tsuchiya | B60L 55/00 |
| 2022/0289060 | A1 | 9/2022 | Tsuchiya | |
| 2022/0379763 | A1* | 12/2022 | Kydd | B60L 53/64 |

FOREIGN PATENT DOCUMENTS

| | | | |
|---|---|---|---|
| JP | 2014-093851 | A | 5/2014 |
| JP | 2017-073915 | A | 4/2017 |
| JP | 2022139814 | A | 9/2022 |

* cited by examiner

*Primary Examiner* — Aaron L Troost

(74) *Attorney, Agent, or Firm* — HAUPTMAN HAM, LLP

(57) ABSTRACT

The vehicle includes a power storage device, a temperature control device configured to be capable of regulating the temperature of the power storage device, and a processing device. When the vehicle is capable of supplying power to a predetermined facility and cooling or heating of the power storage device is required, the processing device is programmed to determine whether the power storage device is to be cooled or heated by supplying power from the power storage device to the temperature control device or by using energy from the predetermined facility.

6 Claims, 4 Drawing Sheets

VEHICLE, PREDETERMINED FACILITY, AND PROCESSING SYSTEM

CROSS-REFERENCE TO RELATED APPLICATION

The present disclosure claims priority to Japanese Patent Application No. 2023-007450 filed on Jan. 20, 2023, which is incorporated herein by reference in its entirety including specification, drawings and claims.

TECHNICAL FIELD

The present disclosure relates to vehicle, predetermined facility, and processing system.

BACKGROUND

Conventionally, a vehicle has been proposed that includes a power supply device and is configured to be capable of supplying power from the power supply device to an external load (see, for example, Patent Document 1). The power supply device includes an engine, a generator that generates power using power from the engine, and a power storage device that is able to be charged with power from the outside of the vehicle or be supplied to the outside of the vehicle. The vehicle calculates the degree of deterioration of the vehicle based on the power supplied from the power supply device to the external load, and notifies the calculated degree of deterioration.

CITATION LIST

Patent Literature

PTL 1: JP2014-93851

SUMMARY

In the vehicle described above, no consideration is given to how to cool or heat the power storage device when the vehicle is capable of supplying power to a predetermined facility as the external load and cooling or heating of the power storage device is required. In a case where the power storage device is always cooled or heated by supplying the power from the power storage device, the power storage device is used frequently and the deterioration of the power storage device may be accelerated.

A main object of the present disclosure is to suppress the deterioration of the power storage device.

The present disclosure employs the following configuration in order to achieve the above main object.

The vehicle includes a power storage device, a temperature control device configured to be capable of regulating the temperature of the power storage device, and a processing device. When the vehicle is capable of supplying power to a predetermined facility and cooling or heating of the power storage device is required, the processing device is programmed to determine whether the power storage device is to be cooled or heated by supplying power from the power storage device to the temperature control device or by using energy from the predetermined facility.

In the vehicle of the present disclosure, when the vehicle is capable of supplying the power to the predetermined facility and cooling or heating of the power storage device is required, the processing device is programmed to determine whether the power storage device is to be cooled or heated by supplying the power from the power storage device to the temperature control device or by using the energy from the predetermined facility. Therefore, when the cooling or heating of the power storage device is required, the vehicle can suppress the degradation of the power storage device compared to when the power storage device is always cooled or heated by supplying the power from the power storage device to the temperature control device. This may be particularly useful for the vehicle that has been parked in the parking lot of the predetermined facility for an extended period of time. When the processing device determines that the power storage device is to be cooled or heated by supplying the power from the power storage device to the temperature control device, the processing device may operate the temperature control device by supplying the power from the power storage device. When the processing device determines that the power storage device is to be cooled or heated by using the energy from the predetermined facility, the processing device may also notify the fact to the predetermined facility.

The predetermined facility includes a processing device. When a vehicle, including a power storage device and a temperature control device configured to be capable of regulating a temperature of the power storage device, is capable of supplying power to the predetermined facility and cooling or heating of the power storage device is required, the processing device is programmed to determine whether the power storage device is to be cooled or heated by supplying power from the power storage device to the temperature control device or by using energy from the predetermined facility.

In the predetermined facility of the present disclosure, when the vehicle, including the power storage device and the temperature control device configured to be capable of regulating the temperature of the power storage device, is capable of supplying power to a predetermined facility and the cooling or heating of the power storage device is required, the processing device is programmed to determine whether the power storage device is to be cooled or heated by supplying power from the power storage device to the temperature control device or by using energy from the predetermined facility. Therefore, when the cooling or heating of the power storage device is required, the predetermined facility can suppress the degradation of the power storage device to when the power storage device is always cooled or heated by supplying the power from the power storage device to the temperature control device.

The processing system includes a vehicle including a power storage device, a temperature control device configured to be capable of regulating a temperature of the power storage device, and a first processing device, and a predetermined facility including a second processing device. When the vehicle is capable of supplying power to a predetermined facility and cooling or heating of the power storage device is required, the first processing device or the second processing device is programmed to determine whether the power storage device is to be cooled or heated by supplying power from the power storage device to the temperature control device or by using energy from the predetermined facility.

In the processing system of the present disclosure, when the vehicle is capable of supplying power to a predetermined facility and the cooling or heating of the power storage device is required, the first processing device or the second processing device is programmed to determine whether the power storage device is to be cooled or heated by supplying power from the power storage device to the temperature control device or by using energy from the predetermined facility. Therefore, when the cooling or heating of the power storage device is required, the processing system can suppress the degradation of the power storage device compared to when the power storage device is always cooled or heated by supplying the power from the power storage device to the temperature control device.

DESCRIPTION OF EMBODIMENTS

Figure 1:
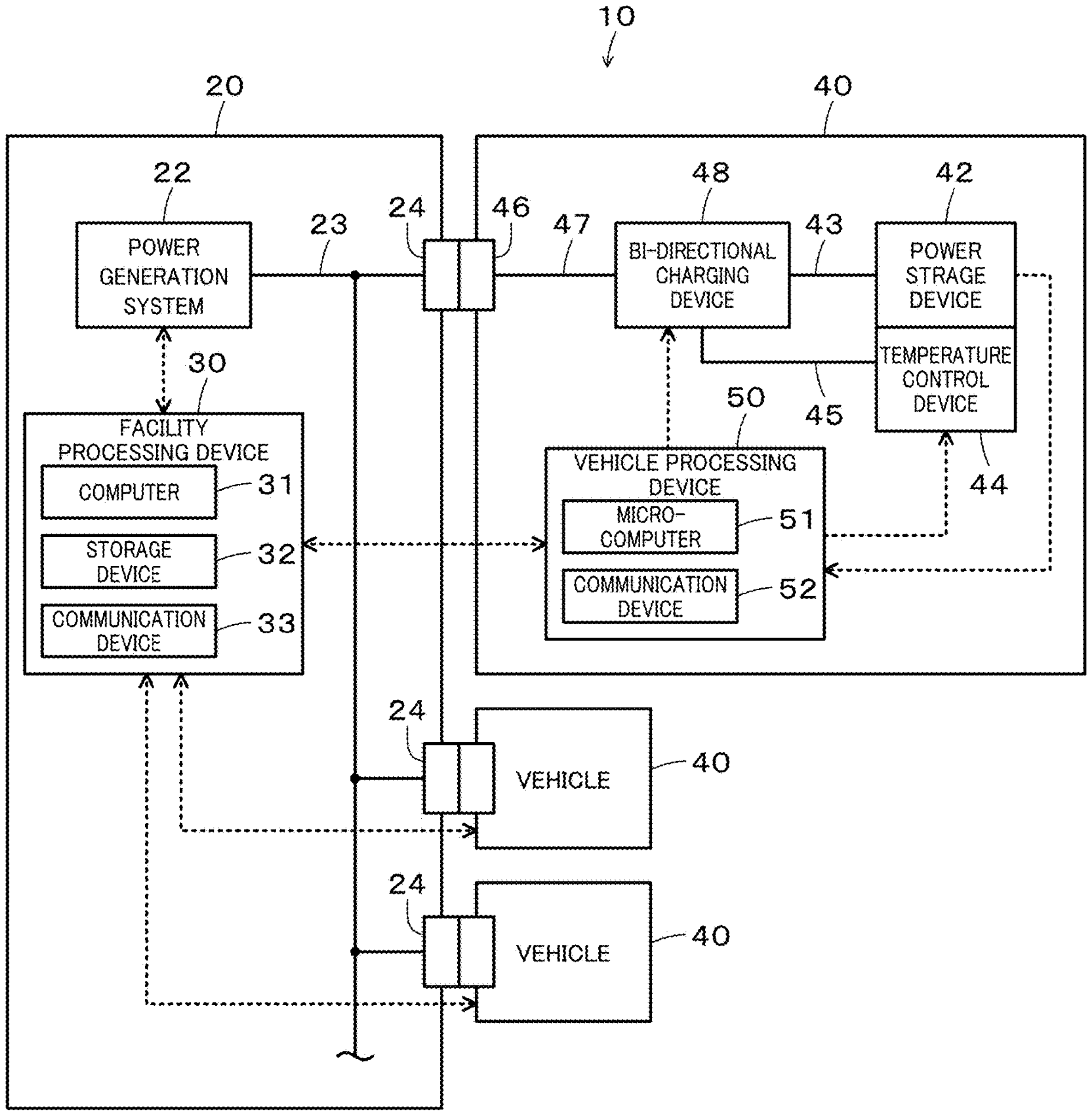
FIG. 1 is a schematic diagram of the processing system of present embodiment.

The embodiment of the present disclosure will be described with reference to the drawings. FIG. 1 is a schematic diagram of a processing system of this embodiment. As shown in the figure, the processing system 10 of this embodiment includes the airport facility 20 as a predetermined facility and the plurality of vehicles 40. The plurality of vehicles 40 are parked in the parking lot of the airport facility 20. The plurality of vehicles 40 participate in a virtual power plant (VPP). The plurality of vehicles 40 are capable of exchanging power with the airport facility 20. The number of vehicles 40 participating in the VPP may be one.

The airport facility 20 includes the power generation system 22, the plurality of facility side connectors 24, and the facility processing device 30. The power generation system 22 and the plurality of facility side connectors 24 are connected via the power lines 23. The power lines 23 are also connected to the various electrical loads (equipment) within the airport facility 20 and to the power systems outside the airport facility 20.

The power generation system 22 is configured as a solar power generation system and includes a solar panel, a power storage device, and a converter. The solar panel generates electricity using sunlight. The power storage device is configured as a lithium ion rechargeable battery or NAS rechargeable battery, for example, and is connected to the same power line with the solar panel and the converter. The converter converts the DC power from the solar panels and the power storage devices into AC power and supplies it to the power line 23. The plurality of facility side connectors 24 are each configured to be connectable to the vehicle side connector 46 of the vehicle 40.

The facility processing device 30 includes the computer 31, the storage device 32, and the communication device 33. The computer 31, the storage device 32, and the communication device 33 are connected to each other through communication lines. The computer 31 includes a CPU, ROM, RAM, flash memory, input/output ports, and communication ports. The computer 31 inputs the power generation Pg of the power generation system 22 and the power consumption Pd of the airport facility 20. The computer 31 controls the power generation system 22. The computer 31 calculates the power generation amount Qg and the power generation amount prediction value Qges of the power generation system 22 and the power demand Qd and the power demand prediction value Qdes of the airport facility 20.

The power generation amount Qg of the power generation system 22 is the power generation amount of the power generation system 22 during the predetermined time T1 up to the present time, and is calculated as the time integrated value of the power generation Pg of the power generation system 22 during the predetermined time T1 up to the present time. The power generation amount prediction value Qges of the power generation system 22 is the prediction value of the power generation amount of the power generation system 22 during the predetermined time T2 from the present time and is calculated based on at least one of the following: the power generation Pg or the power generation amount Qg of the power generation system 22, the current sunshine amount, temperature, or wind speed, the sunshine amount prediction value, the temperature prediction value, or the wind speed prediction value during the predetermined time T2 from the present.

The power demand Qd of the airport facility 20 is the power demand (power consumption amount) of the airport facility 20 during the predetermined time T1 to the present and is calculated as the time integrated value of the power consumption Pd of the airport facility 20 during the predetermined time T1 to the present. The power demand prediction value Qdes of the airport facility 20 is the prediction value of the power demand of the airport facility 20 during the predetermined time T2 from the present and is calculated based on at least one of the following: the power consumption Pd or the power demand Qd of the airport facility 20, the current number of users of the airport facility 20, the schedule of aircraft arrivals and departures at the airport facility 20 or the predicted number of users of the airport facility 20 during the predetermined time T2 from the present.

The storage device 32 is configured as a mass storage device, for example, an SSD or a hard disk. The communication device 33 communicates with the outside of the facility processing device 30, for example, each of the vehicles 40.

Each of the vehicles 40 is configured as a battery electric vehicle having a driving motor and the power storage device 42, a hybrid electric vehicle having the driving motor, an engine, and the power storage device 42, and a fuel cell electric vehicle having the driving motor, the power storage device 42, and a fuel cell. In addition to the power storage device 42, each of the vehicles 40 includes the temperature control device 44, the vehicle side connector 46, the bidirectional charging device 48, and the vehicle processing device 50.

The power storage device 42 is configured as a lithium ion rechargeable battery or a nickel metal hydride battery, for example, and is capable of supplying power to the motor for driving. The temperature control device 44 includes the fan and heater, and cools or heats the power storage device 42 by selectively operating the fan and heater. The vehicle side connector 46 is configured to be connectable to the facility side connector 24 of the airport facility 20.

The bidirectional charging power system 48 is connected to the power line 43, which is connected to the power storage device 42, the power line 45, which is connected to the temperature control device 44, and the power line 47, which is connected to the vehicle side connector 46. The bidirectional charging power system 48 supplies the power of the power line 47 to at least one of the power lines 43 and 45, or supplies the power of the power line 43 to at least one of the power lines 45 and 47. That is, operation of the bidirectional charging device 48 is capable of supplying power from one of the airport facility 20 and the vehicle 40 to the other. The operation of the bidirectional charging device 48 is also capable of operating the temperature control device 44 using power supplied from one of the airport facility 20 and the power storage device 42. In this embodiment, the power in the power lines 43 and 45 is DC power, and the power in the power line 47 is AC power. Thus, the bidirectional charging power system 48 converts DC power to AC power or AC power to DC power between the power lines 43 and 45 and the power line 47.

The vehicle processing device 50 includes the microcomputer 51 and the communication device 52. The microcomputer 51 has a CPU, ROM, RAM, flash memory, I/O ports, and communication ports. The microcomputer 51 inputs the voltage Vb, current Ib, and temperature Tb of the power storage device 42. The microcomputer 51 calculates the state of charge SOC of the power storage device 42 based on the current Ib of the power storage device 42. The microcomputer 51 controls the temperature controller 44 and the bidirectional charging device 48. The first allowable upper and lower limits Smax1, Smin1 and the second allowable upper and lower limits Smax2, Smin2 of the power storage device 42 are stored in the ROM or flash memory of the microcomputer 51. The first allowable upper and lower limits Smax1 and Smin1 are the upper and lower limits of the allowable state of charge range when the allowable state of charge range of the power storage device 42 is the normal range as the first range (e.g., the range used when the vehicle 40 is running). The second allowable upper and lower limits Smax2 and Smin2 are the upper and lower limits of the allowable state of charge range when the allowable state of charge range of the power storage device 42 is the expanded range as the second range expanded from the normal range. The second allowable upper limit Smax2, the first allowable upper limit Smax1, the first allowable lower limit Smin1, and the second allowable lower limit Smin2 are set in this order from the larger side. The communication device 52 communicates with the outside of the vehicle processing device 50, such as the airport facility 20 and other vehicles 40.

Figure 2:
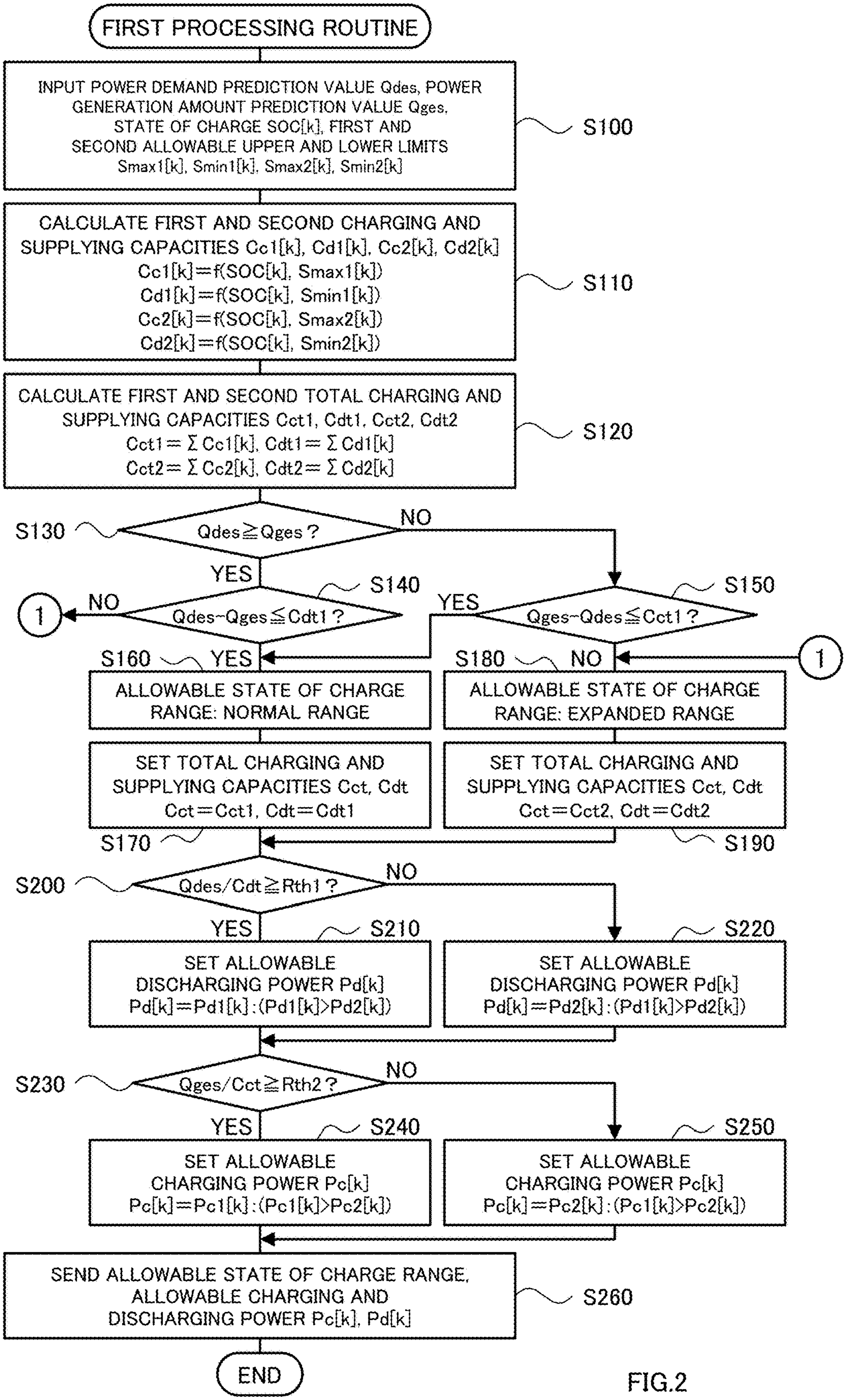
FIG. 2 is a flowchart showing an example of the first processing routine executed by the facility processing device of the airport facility.
Figure 3:
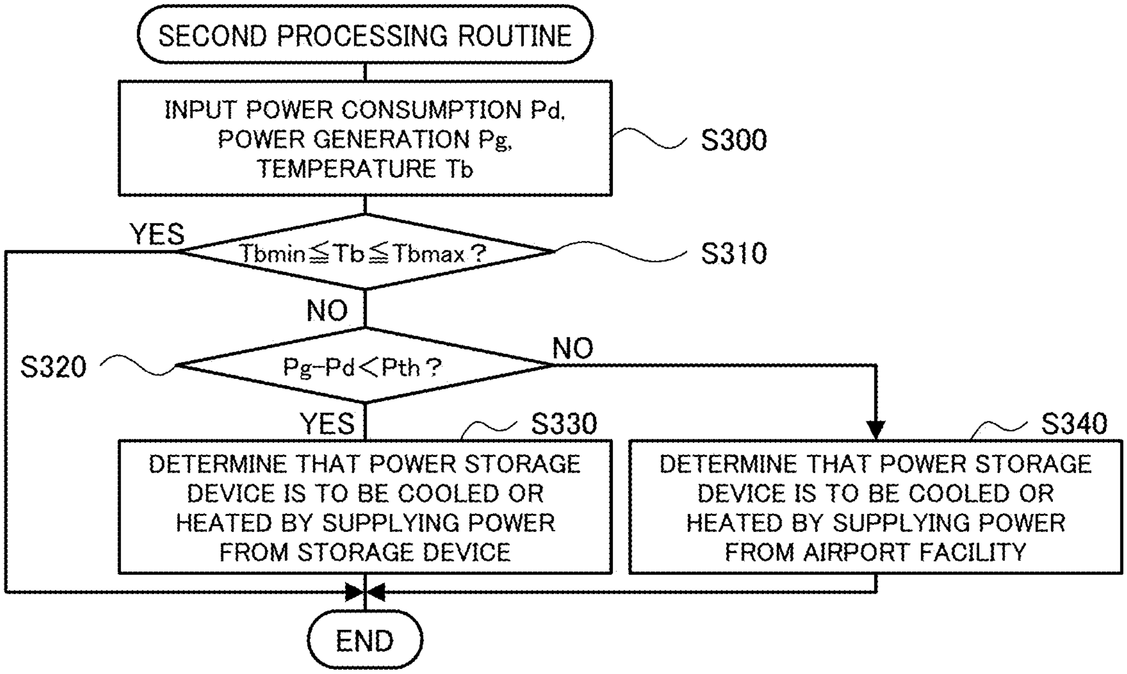
FIG. 3 is a flowchart showing an example of the second processing routine executed by the vehicle processing devices of each vehicle.

The operation of the processing system 10 is described next. FIG. 2 is a flowchart showing an example of the first processing routine performed by the facility processing device 30 of the airport facility 20. FIG. 3 is a flowchart showing an example of the second processing routine executed by the vehicle processing devices 50 of each vehicle 40. Each of these routines is performed repeatedly. They are described in the following order.

When the processing routine of FIG. 2 is performed, the computer 31 of the facility processing device 30 first inputs the power demand prediction value Qdes of the airport facility 20, the power generation amount prediction value Qges of the power generation system 22 of the airport facility 20, the state of charge SOC[k] (the value k corresponding to each of the vehicles 40) of the power storage device 42 of each of the vehicles 40, the first allowable upper and lower limits Smax1[*k*] and Smin1[*k*] and the second allowable upper and lower limits Smax2[*k*] and Smin2[*k*] of the power storage device 42 of each of the vehicles 40 (step S100). The power demand prediction value Qdes of the airport facility 20 and the power generation amount prediction value Qges of the power generation system 22 of the airport facility 20 are input values calculated by the facility processing device 30. The state of charge SOC[k] of the power storage device 42 of each of the vehicles 40 and the first allowable upper and lower limits Smax1[*k*] and Smin1[*k*] and the second allowable upper and lower limits Smax2[*k*] and Smin2[*k*] of the power storage device 42 of each of the vehicles 40 are input by each of the vehicles 40 via communication.

The computer 31 then calculates the first and second charging capacities Cc1[*k*] and Cc2[*k*] and the first and second supplying capacities Cd1[*k*] and Cd2[*k*] of each of the vehicles 40 (step S110). The computer 31 calculates the first and second total charging capacities Cct1 and Cct2 and the first and second total supplying capacities Cdt1 and Cdt2 of all of the vehicles 40 (step S120).

The first and second charging capacities Cc1[*k*] and Cc2[*k*] are the charging capacities (the allowable charging electric energy of the power storage device 42) of each of the vehicles 40 when the allowable state of charge range of the power storage device 42 of each of the vehicles 40 is the normal range and the expanded range, respectively. The first and second charging capacities Cc1[*k*] and Cc2[*k*] are calculated based on the values ΔSh1[*k*] and ΔSh2[*k*], respectively, which are obtained by subtracting the state of charge SOC[k] from the first and second allowable upper limits Smax1[*k*] and Smax2[*k*], of the power storage device 42. For example, when the value ΔSh1[*k*] is positive, the first charging capacity Cc1[*k*] is set with the value ΔSh1[*k*] converted to electric energy. When the value ΔSh1[*k*] is less than or equal to the value 0, the first charging capacity Cc1[*k*] is set to the value 0. The same applies to the second charging capacity Cc2[*k*]. The first and second charging capacities Cc1[*k*] and Cc2[*k*] of each of the vehicles 40 may be defined as the electric energy based on the allowable charging electric energy of the power storage device 42 and the supplying electric energy to the temperature control device 44 when cooling or heating of the power storage device 42 is required.

The first and second supplying capacities Cd1[*k*] and Cd2[*k*] are the supplying capacities (the allowable supply electric energy from each of the vehicles 40 to the airport facility 20) of each of the vehicles 40 when the allowable state of charge range of the power storage device 42 of each of the vehicles 40 is the normal range and the expanded range, respectively. The first and second supplying capacities Cd1[*k*] and Cd2[*k*] are calculated based on the values ΔSl1[*k*] and ΔSl2[*k*], respectively, which are obtained by subtracting the first and second allowable lower limits Smin1[*k*] and Smin2[*k*], respectively, from the state of charge SOC[k] of the power storage device 42. For example, when the value ΔSl1[*k*] is positive, the first supplying capacity Cd1[*k*] is set with the value ΔSl1[*k*] converted to into electric energy. When the value ΔSl1[*k*] is less than or equal to the value 0, the first supplying capacity Cd1[*k*] is set to the value 0. The same applies to the second charging capacity Cd2[*k*]. The first and second supplying capacities Cd1[*k*] and Cd2[*k*] of each of the vehicles 40 may be defined as the electric energy based on the allowable supply electric energy from each of the vehicles 40 to the airport facility 20 and the supply electric energy to the temperature control device 44 when cooling or heating of the power storage device 42 is required.

The first and second total charging capacities Cct1 and Cct2 are the charging capacities (the allowable charging electric energy of the power storage device 42) of all of the vehicles 40 when the allowable state of charge range of the power storage device 42 of each of the vehicles 40 is the normal range and the expanded range, respectively. The first and second total charging capacities Cct1 and Cct2 are calculated as the sum of the first and second charging capacities Cc1[*k*] and Cc2[*k*] of each of the vehicles 40, respectively. The first and second total supplying capacities Cdt1 and Cdt2 are the supplying capacities (the allowable supply electric energy to the airport facility 20) of all of the vehicles 40 when the allowable state of charge range of the power storage device 42 of each of the vehicles 40 is the normal range and the expanded range, respectively. The first and second total supplying capacities Cdt1 and Cdt2 are calculated as the sum of the first and second supplying capacities Cd1[*k*] and Cd2[*k*] of each of the vehicles 40, respectively.

The computer 31 then determines whether the power demand prediction value Qdes of the airport facility 20 is equal to or larger than the power generation amount prediction value Qges of the power generation system 22 of the airport facility 20 (step S130). When the computer 31 determines that the power demand prediction value Qdes is equal to or larger than the power generation amount prediction value Qges, the computer 31 then determines whether the excess power demand prediction value (Qdes−Qges) obtained by subtracting the power generation amount prediction value Qges from the power demand prediction value Qdes is within the range of the first total supplying capacity Cdt1 (step S140). This process determines whether or not the entire excess power demand prediction value (Qdes−Qges) is available to supply power to the airport facility 20 from each of the vehicles 40, when the allowable state of charge range of the power storage device 42 of each of the vehicles 40 is the normal range.

When the computer 31 determines in step S140 that the excess power demand prediction value (Qdes−Qges) is within the range of the first total supplying capacity Cdt1, the computer 31 determines that the entire excess power demand prediction value (Qdes−Qges) is available to supply power to the airport facility 20 from each of the vehicles 40, using the allowable state of charge range of the power storage device 42 of each of the vehicles 40 as the normal range. In this case, the computer 31 sets the allowable state of charge range of the power storage device 42 of each of the vehicles 40 to the normal range (step S160). The computer 31 sets the total charge supplying capacities Cct and Cdt to the first total charging and supplying capacities Cct1 and Cdt1 for use in the process of steps S200 and S230 described below (step S170).

When the computer 31 determines in step S140 that the excess power demand prediction value (Qdes−Qges) is outside the range of the first total supplying capacity Cdt1, the computer 31 determines that the entire excess power demand prediction value (Qdes−Qges) is not available to supply power to the airport facility 20 from each of the vehicles 40, using the allowable state of charge range of the power storage device 42 of each of the vehicles 40 as the normal range. In this case, the computer 31 sets the allowable state of charge range of the power storage device 42 of each of the vehicles 40 to the expanded range (step S180). The computer 31 sets the total charging supplying capacities Cct and Cdt to the second total supplying capacities Cct2 and Cdt2 (step S190).

When the computer 31 determines in step S130 that the power demand prediction value Qdes is less than the power generation amount prediction value Qges, the computer 31 determines whether the excess power generation amount prediction value (Qges−Qdes), which is obtained by subtracting the power demand prediction value Qdes from the power generation amount prediction value Qges, is within the range of the first total charging capacity Cct1 (step S150). This process determines whether or not the entire excess power generation amount prediction value (Qges−Qdes) is available to supply power to each of the vehicles 40 from the airport facility 20, when the allowable state of charge range of the power storage device 42 of each of the vehicles 40 is the normal range.

When the computer 31 determines in step S150 that the excess power generation amount prediction value (Qges−Qdes) is within the range of the first total charging capacity Cct1, the computer 31 determines that the entire excess power generation amount prediction value (Qges−Qdes) is available to supply power to each of the vehicles 40 from the airport facility 20, using the allowable state of charge range of the power storage device 42 of each of the vehicles 40 as the normal range. In this case, the computer 31 sets the allowable state of charge range of the power storage device 42 of each of the vehicles 40 to the normal range (step S160). The computer 31 sets the total charging and supplying capacity Cct and Cdt to the first total charging and supplying capacities Cct1 and Cdt1 (step S170).

When the computer 31 determines in step S150 that the excess power generation amount prediction value (Qges−Qdes) is outside the range of the first total charging capacity Cct1, the computer 31 determines that the entire excess power generation amount prediction value (Qges−Qdes) is not available to supply power to each of the vehicles 40 from the airport facility 20, using the allowable state of charge range of the power storage device 42 of each of the vehicles 40 as the normal range. In this case, the computer 31 sets the allowable state of charge range of the power storage device 42 of each of the vehicles 40 to the expanded range (step S180). The computer 31 sets the total charging and supplying capacities Cct and Cdt to the second total supplying capacities Cct2 and Cdt2 (step S190).

After the computer 31 sets the total charging and supplying capacities Cct and Cdt in step S170 or step S190, the computer 31 determines whether the first ratio (Qdes/Cdt), which is obtained by dividing the power demand prediction value Qdes of the airport facility 20 by the total supplying capacity Cdt, is equal to or larger than the threshold value Rth1 (step S200). The threshold value Rth1 is used to determine whether the first ratio (Qdes/Cdt) is somewhat large. When the computer 31 determines that the first ratio (Qdes/Cdt) is equal to or larger than the threshold value Rth1, the computer 31 sets the allowable discharging power Pd[k] of the power storage device 42 of each of the vehicles 40 to the relatively large value Pd1[*k*] (step S210). On the other hand, when the computer 31 determines that the first ratio (Qdes/Cdt) is less than the threshold value Rth1, the computer 31 sets the allowable discharging power Pd[k] of the power storage device 42 of each of the vehicles 40 to the value Pd2[*k*] less than the value Pd1[*k*] (step S220).

The computer 31 determines whether the second ratio (Qges/Cct), which is obtained by dividing the power generation amount prediction value Qges of the power generation system 22 by the total charging capacity Cct, is equal to or larger than the threshold value Rth2 (step S230). The threshold value Rth2 is used to determine whether the second ratio (Qges/Cct) is somewhat large. When the computer 31 determines that the second ratio (Qges/Cct) is equal to or larger than the threshold value Rth2, the computer 31 sets the allowable charging power Pc[k] of the power storage device 42 of each of the vehicles 40 to the relatively large value Pc1[*k*] (step S240). On the other hand, when the computer 31 determines that the second ratio (Qges/Cct) is less than the threshold value Rth2, the computer 31 sets the allowable charging power Pc[k] of the power storage device 42 of each of the vehicles 40 to the value Pc2[*k*] less than the value Pc1[*k*] (step S250).

The computer 31 sends the allowable state of charge range and the allowable charging and discharging power Pc[k], Pd[k] of the power storage device 42 of each of the vehicles 40 to each of the vehicles 40 (step S260). This routine is terminated. In each of the vehicles 40, the vehicle processing device 50 sets the allowable state of charge range and the allowable charging and discharging power Pc[k] and Pd[k] of the power storage device 42 based on the information received from the airport facility 20.

The facility processing device 30 of the airport facility 20 sends a first request, for supplying power from each of the vehicles 40 to the airport facility 20, to each of the vehicles 40 and sends a second request, for supplying power from the airport facility 20 to each of the vehicles 40, to each of the vehicles 40, based on the relationship between the power demand prediction value Qdes and the power generation amount prediction value Qges (i.e., the relationship between the large and small values and the absolute value of the difference). When the vehicle processing device 50 of each of the vehicles 40 receives the first request, the vehicle processing device 50 controls the bidirectional charging device 48 so that the power is supplied from each of the vehicles 40 to the airport facility 20 within the allowable state of charge range and the allowable discharging power Pd [k] of the power storage device 42. When the vehicle processing device 50 of each of the vehicles 40 receives the second request, the vehicle processing device 50 controls the bidirectional charging device 48 so that the power is supplied from the airport facility 20 to each of the vehicles 40 within the allowable state of charge range and allowable charging power Pc[k] of the power storage device 42.

In this embodiment, when the excess power demand prediction value (Qdes−Qges) is outside the range of the first total supplying capacity Cdt, or when the excess power generation amount prediction value (Qges−Qdes) is outside the range of the first total charging capacity Cdt, the facility processing device 30 sets the allowable state of charge range of the power storage device 42 of each of the vehicles 40 to the expanded range. Therefore, the excess power demand prediction value (Qdes−Qges) is more easily met by the power supply from each of the vehicles 40 to the airport facility 20 and the excess power generation amount prediction value (Qges−Qdes) is more easily met by the power supply from the airport facility 20 to each of the vehicles 40, compared to the case where the allowable state of charge range is set to the normal range.

When the excess power demand prediction value (Qdes−Qges) is within the range of the first total supplying capacity Cdt, or when the excess power generation amount prediction value (Qges−Qdes) is within the range of the first total charging capacity Cct, the facility processing device 30 sets the allowable state of charge range of the power storage device 42 of each of the vehicles 40 to the normal range. Therefore, the degradation of the power storage device 42 is suppressed compared to the case where the allowable state of charge range is the expanded range.

When the first ratio (Qdes/Cdt) is equal to or larger than the threshold value Rth1, the facility processing device 30 sets the allowable discharging power Pd[k] of the power storage device 42 of each of the vehicles 40 to the relatively large value Pd1[*k*]. When the second ratio (Qges/Cct) is equal to or larger than the threshold value Rth2, the facility processing device 30 sets the allowable charging power Pc[k] of the power storage device 42 of each of the vehicles 40 to the relatively larger value Pc1[*k*]. Thus, the processing system 10 can supply power from each of the vehicles 40 to the airport facility 20 and from the airport facility 20 to each of the vehicles 40 with relatively high power.

When the first ratio (Qdes/Cdt) is less than the threshold value Rth1, the facility processing device 30 sets the allowable discharging power Pd[k] of the power storage device 42 of each of the vehicles 40 to the value Pd2[*k*], which is less than the value Pd1[*k*]. When the second ratio (Qges/Cct) is less than the threshold value Rth2, the facility processing device 30 sets the allowable charging power Pc[k] of the power storage device 42 of each of the vehicles 40 to the value Pc2[*k*] less than the value Pc1[*k*]. Therefore, the power is limited when power is supplied from each of the vehicles 40 to the airport facility 20 and from the airport facility 20 to each of the vehicles 40. As a result, the processing system 10 can suppress the degradation of the power storage device 42.

Next, the second processing routine of FIG. 3 is described. When this routine is performed, in each of the 40 vehicles, the microcomputer 51 of the vehicle processing device 50 first inputs the power consumption Pd and power generation Pg of the airport facility 20 and the temperature Tb of the power storage device 42 of its own vehicle 40 (step S300). The power consumption Pd and power generation Pg of the airport facility 20 are input from the airport facility 20 via communication. The temperature Tb is input as a value stored in the microcomputer 51.

The microcomputer 51 then determines whether the temperature Tb of the power storage device 42 is equal to or larger than the threshold value Tbmin and equal to or less than the threshold value Tbmax (step S310). The threshold value Tbmin is used to determine whether heating of the power storage device 42 is required, and the threshold value Tbmax is used to determine whether cooling of the power storage device 42 is required.

When the microcomputer 51 determines that the temperature Tb of the power storage device 42 is equal to or larger than the threshold value Tbmin and equal to or less than the threshold value Tbmax in step S310, the microcomputer 51 determines that neither cooling nor heating of the power storage device 42 is required, and this routine is terminated.

When the microcomputer 51 determines in step S310 that the temperature Tb of the power storage device 42 is less than the threshold value Tbmin or the temperature Tb is larger than the threshold value Tbmax, the microcomputer 51 determines that cooling or heating of the power storage device 42 is required. In this case, the microcomputer 51 determines whether the excess power generation (Pg−Pd), which is obtained by subtracting the power consumption Pd from the power generation Pg, is less than the positive threshold value Pth (step S320). The excess power generation (Pg−Pd) may be positive, zero or negative. The threshold Pth is used to determine whether the excess power generation (Pg−Pd) is somewhat large. The threshold value Pth may be a constant value or a value obtained by dividing a constant value by the number of vehicles participating in the VPP.

When the microcomputer 51 determines that the excess power generation (Pg−Pd) is less than the threshold value Pth in step S320, the microcomputer 51 determines that the excess power generation (Pg−Pd) is not so large. The microcomputer 51 determines that the power storage device 42 is to be cooled or heated by the power supply from the power storage device 42 (step S330). This routine is terminated. In this case, the vehicle processing device 50 controls the bidirectional charging device 48 so that the power from the power storage device 42 is supplied to the temperature control device 44 via the bidirectional charging device 48, and controls the temperature control device 44 so that the fan or heater of the temperature control device 44 operates. In this case, when the vehicle processing device 50 receives the first request from the airport facility 20 to supply the power from each of the vehicles 40 to the airport facility 20, the vehicle processing device 50 controls the bidirectional charging device 48 so that the power from the power storage device 42 is supplied to the temperature control device 44 and the airport facility 20 via the bidirectional charging device 48. In this case, when the vehicle processing device 50 receives the second request from the airport facility 20 to supply the power from the airport facility 20 to each of the vehicles 40 in this case, the vehicle processing device 50 rejects the second request.

When the microcomputer 51 determines that the excess power generation (Pg−Pd) is equal to or larger than the threshold value Pth in step S320, the microcomputer 51 determines that the excess power generation (Pg−Pd) is somewhat large. The microcomputer 51 determines that the power storage device 42 is to be cooled or heated by the power supply from the airport facility 20 (step S340). This routine is terminated. In this case, the vehicle processing device 50 controls the bidirectional charging device 48 so that the power from the airport facility 20 is supplied to the temperature control device 44 via the bidirectional charging device 48, and controls the temperature control device 44 so that the fan or heater of the temperature control device 44 operates. Therefore, the vehicle processing device 50 can effectively use the excess power generation (Pg−Pd) to cool or heat the power storage device 42. In this case, when the vehicle processing device 50 receives the second request from the airport facility 20 to supply the power from the airport facility 20 to each of the vehicles 40, the vehicle processing device 50 controls the bidirectional charging device 48 so that the power from the airport facility 20 is supplied to the power storage device 42 and the temperature control device 44 via the bidirectional charging device 48. In this case, when the vehicle processing device 50 receives the first request from the airport facility 20 to supply the power from each of the vehicles 40 to the airport facility 20, the vehicle processing device 50 rejects the first request.

Figure 4:
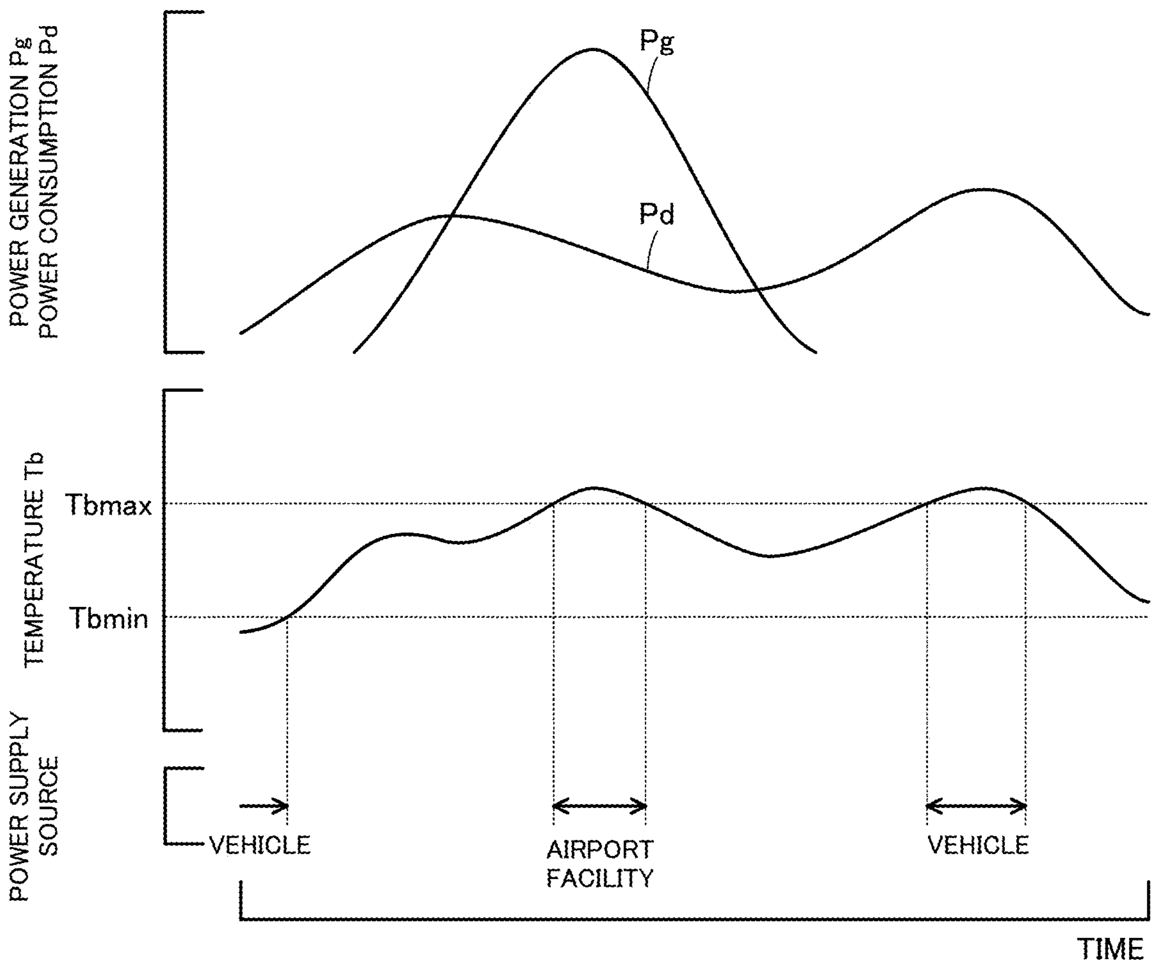
FIG. 4 is an illustration showing an example of the power generation and power consumption of the airport facility, the temperature of the power storage device of the vehicle, and the power supply source when cooling or heating the power storage device at each time.

FIG. 4 is an illustration showing an example of the power generation Pg and power consumption Pd of the airport facility 20, the temperature Tb of the power storage device 42 of the vehicle 40, and the power supply source when cooling or heating the power storage device 42 at each time. As illustrated, when the temperature Tb of the power storage device 42 is less than the threshold value Tbmin or larger than the threshold value Tbmax during the time period when the power consumption Pd is larger than the power generation Pg, each of the vehicles 40 operates the temperature control device 44 by the power supply from the power storage device 42 to the temperature control device 44 to cool or heat the power storage device 42. On the other hand, when the temperature Tb of the power storage device 42 is larger than the threshold value Tbmax during the time period when the power generation Pg is somewhat larger than the power consumption Pd, each of the vehicles 40 operates the temperature control device 44 by supplying power from the airport facility 20 to the temperature control device 44 to cool the power storage device 42. Therefore, each of the vehicles 40 can effectively use the excess power generation (Pg−Pd) to cool the power storage device 42.

In the vehicle 40 equipped with the processing system 10 of this embodiment described above, when cooling or heating of the power storage device 42 of the vehicle 40 is required and the excess power generation (Pg−Pd) of the airport facility 20 is less than the threshold value Pth, the vehicle processing device 50 determines that the power storage device 42 is to be cooled or heated by supplying the power from the power storage device 42 of the vehicle 40. On the other hand, when cooling or heating of the power storage device 42 of the vehicle 40 is required and the excess power generation (Pg−Pd) is equal to or larger than the threshold value Pth, the vehicle processing device 50 determines that the power storage device 42 is to be cooled or heated by supplying the power from the airport facility 20. Therefore, each of the vehicles 40 can effectively use the excess power generation (Pg−Pd) to cool the power storage device 42. In these ways, the cooling or heating of the power storage devices 42 can be performed by more appropriate methods. As a result, when cooling or heating of the power storage device 42 is required, each of the vehicles 40 can suppress degradation of the power storage device 42 compared to when the power storage device 42 is constantly cooled or heated by the power supply from the power storage device 42. This would be particularly useful for the vehicles 40 that are parked in the parking lot of the airport facility 20 for long periods of time.

In the embodiment described above, the processing system 10 is capable of cooling or heating the power storage device 42 of the vehicle 40 by supplying the power from the airport facility 20. However, the processing system 10 need only be capable of cooling or heating the power storage device 42 using the energy from the airport facility 20. For example, the processing system 10 may be capable of heating the power storage device 42 of the vehicle 40 using waste heat from the airport facility 20. The waste heat from the airport facility 20 may be, for example, waste heat generated by power generation in the power generation system 22. The heating of the power storage device 42 of the vehicle 40 using the waste heat from the airport facility 20 is performed, for example, by heating the parking lot of the airport facility 20 with the waste heat or by blowing air heated by the waste heat to the vehicles 40. In this case, when heating of the power storage device 42 of the vehicle 40 is required, each of the vehicles 40 may determine whether to heat the power storage device 42 by supplying the power from the power storage device 42 of its own vehicle 40 or by using the waste heat from the airport facility 20, based on whether or not heating of the power storage device 42 of the vehicle 40 using the waste heat from the airport facility 20 is possible. The processing system 10 may also be capable of cooling the power storage device 42 of the vehicle 40 using the snow and ice heat from the airport facility 20. Cooling of the power storage device 42 of the vehicle 40 using the snow and ice heat from the airport facility 20 is performed, for example, by cooling the parking lot of the airport facility 20 with the snow and ice heat or by blowing air cooled by the snow and ice heat onto the vehicle 40. In this case, when cooling of the power storage device 42 of the vehicle 40 is required, each of the vehicles 40 may determine whether the power storage device 42 is to be cooled by supplying the power from the power storage device 42 of its own vehicle 40 or by using the snow and ice heat of the airport facility 20, based on whether or not cooling of the power storage device 42 of the vehicle 40 using the snow and ice heat of the airport facility 20 is possible.

In the embodiment described above, when cooling or heating of the power storage device 42 of the vehicle 40 is required, the vehicle processing device 50 of the vehicle 40 determines whether the power storage device 42 is cooled or heated by supplying the power from the power storage device 42 of its own vehicle 40 or by supplying the power from the airport facility 20, based on the excess power generation (Pg−Pd). However, instead of the excess power generation (Pg−Pd), the excess power generation amount (Qg−Qd) may be used. The excess power generation amount prediction value (Qges−Qdes) may also be used.

In the embodiments described above, the second processing routine of FIG. 3 is always executed by the vehicle processing device 50 of the vehicle 40. However, the second processing routine may be executed only when the vehicle 40 is not supplying power to the airport facility 20. It may also be executed only when the vehicle 40 is supplying power to the airport facility 20.

In the embodiment described above, when the power generation amount prediction value Qdes is equal to or larger than the power generation amount prediction value Qges, the facility processing device 30 of the airport facility 20 sets the allowable state of charge range of the power storage device 42 of each of the vehicles 40 to the normal range or the expanded range, based on whether the excess power demand prediction value (Qdes−Qges) is within the range of the first total supplying capacity Cdt. When the power generation amount prediction value Qdes is less than the power generation amount prediction value Qges, the facility processing device 30 sets the allowable state of charge range of the power storage device 42 of each of the vehicles 40 to the normal range or the expanded range, based on whether the excess power generation amount prediction value (Qges−Qdes) is within the range of the first total charging capacity Cct. However, when the power demand Qd is equal to or larger than the excess power generation amount Qg, the excess power demand (Qd−Qg) may be used instead of the excess power demand prediction value (Qdes−Qges). When the power generation demand Qd is less than the power generation amount Qg, the excess power generation amount prediction value (Qg−Qd) may be used instead of the excess power generation amount prediction value (Qges−Qdes). The facility processing device 30 may set the allowable state of charge range for the power storage device 42 in each of the vehicles 40 in the normal or extended range, regardless of these factors.

In the embodiment described above, the facility processing device 30 of the airport facility 20 sets the allowable discharging power Pd[k] of the power storage device 42 of each of the vehicles 40 to the value Pd1[*k*] or the value Pd2[*k*] based on the first ratio (Qdes/Cdt). However, the facility processing device 30 may use the first ratio as the ratio obtained by dividing the power demand Qd of the airport facility 20 by the total supplying capacity Cdt, instead of the ratio obtained by dividing the power demand prediction value Qdes of the airport facility 20 by the total supplying capacity Cdt. The facility processing device 30 may also set the allowable discharging power Pd[k] uniformly at the value Pd1[*k*] or Pd2[*k*], regardless of the first ratio.

In the embodiment described above, the facility processing device 30 of the airport facility 20 sets the allowable charging power Pc[k] of the power storage device 42 of each of the vehicles 40 to the value Pc1[*k*] or the value Pc2[*k*] based on the second ratio (Qges/Cct). However, the facility processing device 30 may use the second ratio as the ratio obtained by dividing the power generation amount Qg of the power generation system 22 by the total charging capacity Cct, instead of the ratio obtained by dividing the power generation amount prediction value Qges of the power generation system 22 by the total charging capacity Cct. The facility processing device 30 may also set the allowable charging power Pc[k] uniformly to the value Pc1[*k*] or Pc2[*k*], regardless of the second ratio.

In the embodiments described above, the first processing routine of FIG. 3 is performed by the facility processing device 30 of the airport facility 20. However, the first processing routine may also be executed by the vehicle processing device 50 of any of the vehicles 40. Also, partial processing of the first processing routine may be executed by the facility processing device 30, and the remaining processing of the first processing routine may be executed by the vehicle processing device 50.

In the embodiments described above, the second processing routine of FIG. 4 is performed by the vehicle processing device 50 of each of the vehicles 40, respectively. However, the second processing routine may also be executed by the facility processing device 30 of the airport facility 20 for each of the vehicles 40.

In the embodiments described above, the bidirectional charging device 48 in each of the vehicles 40 supplies DC power to the temperature control device 44. However, the bidirectional charging device 48 may also supply AC power to the temperature control device 44.

In the embodiments described above, the power generation system 22 of the airport facility 20 is a solar power generation system. However, the power generation system 22 may be a power generation system using renewable energies other than solar power. The renewable energy other than the solar power includes, for example, wind, hydroelectric, geothermal, solar thermal, and biomass. The power generation system 22 may also be a power generation system using energy other than renewable energy. The energy other than the renewable energy includes, for example, nuclear energy or fossil energy such as oil, coal, or natural gas. Further, the power generation system 22 may be a combination of at least two of these.

In the embodiment described above, the predetermined facility is the airport facility 20. However, the predetermined facility may be a train station, a shopping mall, a leisure facility, a hospital, a school, a port, etc.

[1] The vehicle includes a power storage device, a temperature control device configured to be capable of regulating the temperature of the power storage device, and a processing device. When the vehicle is capable of supplying power to a predetermined facility and cooling or heating of the power storage device is required, the processing device is programmed to determine whether the power storage device is to be cooled or heated by supplying power from the power storage device to the temperature control device or by using energy from the predetermined facility.

In the vehicle of the present disclosure, when the vehicle is capable of supplying the power to a predetermined facility and cooling or heating of the power storage device is required, the processing device is programmed to determine whether the power storage device is to be cooled or heated by supplying the power from the power storage device to the temperature control device or by using the energy from the predetermined facility. Therefore, when the cooling or heating of the power storage device is required, the vehicle can suppress the degradation of the power storage device compared to when the power storage device is always cooled or heated by supplying the power from the power storage device to the temperature control device. This may be particularly useful for the vehicle that has been parked in the parking lot of the predetermined facility for an extended period of time. When the processing device determines that the power storage device is to be cooled or heated by supplying the power from the power storage device to the temperature control device, the processing device may operate the temperature control device by supplying the power from the power storage device. When the processing device determines that the power storage device is to be cooled or heated by using the energy from the predetermined facility, the processing device may also notify the fact to the predetermined facility.

[2] In the vehicle of the present disclosure (the vehicle described in [1] above), cooling or heating of the power storage device using the energy from the predetermined facility may be cooling or heating of the power storage device by supplying power from the predetermined facility to the temperature control device. Heating of the power storage device using the energy from the predetermined facility may be heating of the power storage device using waste heat from the predetermined facility.

[3] In this case vehicle (the vehicle described in [2] above), when the vehicle is capable of supplying power to the predetermined facility and the cooling or heating of the power storage device is required, the processing device may be programmed to determine that the power storage device is to be cooled or heated by supplying the power from the storage device to the temperature control device in a case where an excess amount of a power generation related value relating to power generation of the predetermined facility over a power consumption related value relating to power consumption of the predetermined facility is less than a threshold value, and the processing device may be programmed to determine that the power storage device is to be cooled or heated by supplying the power from the predetermined facility to the temperature control device in a case where the excess amount is equal to or larger than the threshold value. Therefore, based on the excess amount, the vehicle can determine whether the power storage device is to be cooled or heated by supplying the power from the power storage device to the temperature control device or by using the energy from the predetermined facility. The "power consumption related value" includes not only the power consumption but also the power demand in a first predetermined time period up to the present and the power demand prediction value in a second predetermined time period up to the present. The "power generation related value" includes not only the power generation, but also the power generation amount in the first predetermined time period up to the present and the power generation amount prediction value in the second predetermined time period up to the present. The "surplus amount" includes the excess power generation, the excess power generation amount, and the excess power generation amount prediction value, as described below.

[4] In the vehicle of the present disclosure (the vehicle described in any of [1] to [3] above), the processing device may be programmed to determine whether the cooling or heating of the power storage device is required based on a temperature of the power storage device, in at least one of a case where the vehicle does not supply power to the predetermined facility and a case where it supplies power.

[5] In the vehicle of the present disclosure (the vehicle described in any of [1] to [4] above), when a difference value between a power demand related value relating to a power demand of the predetermined facility and a power generation amount related value relating to a power generation amount of the predetermined facility is within a range of a total charging and supplying capacity of the power storage devices of one or more charging and supplying vehicles, that are configured to be capable of exchanging power with the predetermined facility and that include the own vehicle, the processing device may be programmed to set an allowable state of charge range of the power storage devices of one or more of the charging and supplying vehicles to the first range, and when the difference value is outside the range of the total charging and supplying capacity range, the processing device may be programmed to set the allowable state of charge range of the power storage devices of one or more the charging and supplying vehicles to the second range, which is larger than the first range. The vehicle sets the allowable state of charge range to the first range when the difference value is within the range of the total charging and supplying capacity. Therefore, the vehicle can suppress the degradation of the power storage device compared to the case where the vehicle sets the allowable state of charge range to the second range. The vehicle sets the allowable state of charge range to the second range when the differential value is outside the range of the total charging and supplying capacity. Therefore, the vehicle can more easily cover the differential value by exchanging power between the predetermined facility and the vehicle compared to the case where the vehicle sets the allowable state of charge range to the first range. The "power demand related value" includes not only the power demand in the first predetermined time period up to the present but also the power demand prediction value in the second predetermined time period up to the present. The "power generation amount related value" includes not only the power generation amount in the first predetermined time period up to the present but also the power generation amount prediction value in the second predetermined time period up to the present. The "difference value" includes the excess power generation amount, the excess power demand, the excess power generation amount prediction value, and the excess power demand prediction value, as described below.

[6] In the vehicle of the present disclosure (the vehicle described in any of [1] to [5] above), when the first ratio, which is obtained by dividing a power demand related value relating to a power demand of the predetermined facility by a total supplying capacity of the power storage devices of one or more charging and supplying vehicles, that are configured to be capable of exchanging power with the predetermined facility and that include the own vehicle, is less than the first ratio threshold value, the processing device may be programmed to limit a supplied power in a case where power is supplied from the power storage device of the charging and supplying vehicle to the predetermined facility, compared to when the first ratio is larger than or equal to the first ratio threshold value, and when the second ratio, which is obtained by dividing a power generation amount related value relating to a power generation amount of the predetermined facility by a total charging capacity of the power storage devices of one or more the charging and supplying vehicles, is less than the second ratio threshold value, the processing device may be programmed to limit charging power in a case where the power storage device of the charging and supplying vehicle is charged by power supplied from the predetermined facility, compared to when the second ratio is larger than or equal to the second ratio threshold value. When the first ratio is less than the first ratio threshold, the vehicle limits the supplied power from the power storage device to the predetermined facility, compared to when the first ratio is equal to or larger than the first ratio threshold, and when the second ratio is less than the second ratio threshold, the vehicle limits the charging power to the power storage device, compared to when the second ratio is equal to or larger than the second ratio threshold. Therefore, the vehicle can suppress the degradation of the power storage device. As mentioned above, the "power demand related value" includes not only the power demand but also the power demand prediction value. The "power generation amount related value" includes not only the power generation amount but also the power generation amount prediction value.

[7] The predetermined facility includes a processing device. When a vehicle, including a power storage device and a temperature control device configured to be capable of regulating a temperature of the power storage device, is capable of supplying power to the predetermined facility and cooling or heating of the power storage device is required, the processing device is programmed to determine whether the power storage device is to be cooled or heated by supplying power from the power storage device to the temperature control device or by using energy from the predetermined facility.

In the predetermined facility of the present disclosure, when the vehicle is capable of supplying power to a predetermined facility and the cooling or heating of the power storage device is required, the processing device is programmed to determine whether the power storage device is to be cooled or heated by supplying power from the power storage device to the temperature control device or by using energy from the predetermined facility. Therefore, when the cooling or heating of the power storage device is required, the predetermined facility can suppress the degradation of the power storage device to when the power storage device is always cooled or heated by supplying the power from the power storage device to the temperature control device.

[8] The processing system includes a vehicle including a power storage device, a temperature control device configured to be capable of regulating a temperature of the power storage device, and a first processing device, and a predetermined facility including a second processing device. When the vehicle is capable of supplying power to a predetermined facility and cooling or heating of the power storage device is required, the first processing device or the second processing device is programmed to determine whether the power storage device is to be cooled or heated by supplying power from the power storage device to the temperature control device or by using energy from the predetermined facility.

In the processing system of the present disclosure, when the vehicle is capable of supplying power to a predetermined facility and the cooling or heating of the power storage device is required, the first processing device or the second processing device is programmed to determine whether the power storage device is to be cooled or heated by supplying power from the power storage device to the temperature control device or by using energy from the predetermined facility. Therefore, when the cooling or heating of the power storage device is required, the processing system can suppress the degradation of the power storage device compared to when the power storage device is always cooled or heated by supplying the power from the power storage device to the temperature control device.

The following describes the correspondence relationship between the primary elements of the embodiment and the primary elements of the present disclosure described in summary. In the embodiment, the vehicle 40 corresponds to "vehicle", the power storage device 42 corresponds to "power storage device", the temperature control device 44 corresponds to "temperature control device", and the vehicle processing device 50 corresponds to "processing device". The excess power generation amount, the excess power generation amount, the excess power generation prediction value, and the excess power generation prediction value correspond to "excess power generation related value", the excess power generation amount, the excess power generation demand, the excess power generation amount prediction value, and the excess power demand prediction value correspond to "the difference between the power demand related value and the power generation related value", and the normal range and the extended range correspond to "first range" and "second range", respectively. The airport facility 20 corresponds to "predetermined facility" and the facility processing device 30 corresponds to "processing device". The processing system 10 corresponds to the "processing system".

The correspondence relationship between the primary elements of the embodiment and the primary elements of the present disclosure described in summary is an example of how the embodiment specifically explains the present disclosure described in summary. Therefore, the correspondence relationship does not limit the elements of the present disclosure described in summary. In other words, interpretation of the present disclosure described in summary should be based on the description in that section. The embodiments are only one specific example of the present disclosure described in summary.

The embodiment for implementing the present disclosure have been described. The present disclosure is in no way limited to such embodiments. The present disclosure can be embodied in various forms without departing from the gist of the present disclosure.

INDUSTRIAL APPLICABILITY

The present disclosure is applicable to the manufacturing industry for vehicles, predetermined facilities, and processing systems.

What is claimed is:

1. A vehicle, comprising:

a power storage device;

a temperature control device configured to be capable of regulating a temperature of the power storage device; and a processing device, wherein when the vehicle is capable of supplying power to a predetermined facility and cooling or heating of the power storage device is required, the processing device is programmed to:

determine whether the power storage device is to be cooled or heated by supplying power from the power storage device to the temperature control device or by using snow and ice heat or waste heat from the predetermined facility, and generate instructions for regulating the temperature of the power storage device, and the temperature control device regulates the temperature of the power storage device based on instructions from the processing device.

2. The vehicle according to claim 1, wherein the processing device is programmed to determine whether the cooling or heating of the power storage device is required based on a temperature of the power storage device, in at least one of a case where the vehicle does not supply power to the predetermined facility and a case where it supplies power.

3. The vehicle according to claim 1, wherein when a difference value between a power demand related value relating to a power demand of the predetermined facility and a power generation amount related value relating to a power generation amount of the predetermined facility is within a range of a total charging and supplying capacity of the power storage devices of one or more charging and supplying vehicles, that are configured to be capable of exchanging power with the predetermined facility and that include the own vehicle, the processing device is programmed to set an allowable state of charge range of the power storage devices of one or more of the charging and supplying vehicles to a first range, and when the difference value is outside the range of the total charging and supplying capacity, the processing device is programmed to set the allowable state of charge range of the power storage devices of one or more the charging and supplying vehicles to a second range, which is larger than the first range.

4. The vehicle according to claim 1, wherein when a first ratio, which is obtained by dividing a power demand related value relating to a power demand of the predetermined facility by a total supplying capacity of the power storage devices of one or more charging and supplying vehicles, that are configured to be capable of exchanging power with the predetermined facility and that include the own vehicle, is less than the first ratio threshold value, the processing device is programmed to limit a supplied power in a case where power is supplied from the power storage device of the charging and supplying vehicle to the predetermined facility, compared to when the first ratio is larger than or equal to the first ratio threshold value, and when the second ratio, which is obtained by dividing a power generation amount related value relating to a power generation amount of the predetermined facility by a total charging capacity of the power storage devices of one or more charging and supplying vehicles, is less than the second ratio threshold value, the processing device is programmed to limit a charging power in a case where the power storage device of the charging and supplying vehicle is charged by power supplied from the predetermined facility, compared to when the second ratio is larger than or equal to the second ratio threshold value.

5. A predetermined facility, comprising:

a processing device, wherein when a vehicle, including a power storage device and a temperature control device configured to be capable of regulating a temperature of the power storage device, is capable of supplying power to the predetermined facility and cooling or heating of the power storage device is required, the processing device is programmed to:

determine whether the power storage device is to be cooled or heated by supplying power from the power storage device to the temperature control device or by using snow and ice heat or waste heat from the predetermined facility, and generate instructions for regulating the temperature of the power storage device, and the temperature control device regulates the temperature of the power storage device based on instructions from the processing device.

6. A processing system, comprising:

a vehicle including a power storage device, a temperature control device configured to be capable of regulating a temperature of the power storage device, and a first processing device; and a predetermined facility including a second processing device, wherein when the vehicle is capable of supplying power to the predetermined facility and cooling or heating of the power storage device is required, the first processing device or the second processing device is programmed to:

determine whether the power storage device is to be cooled or heated by supplying power from the power storage device to the temperature control device or by using snow and ice heat or waste heat from the predetermined facility, and generate instructions for regulating the temperature of the power storage device, and the temperature control device regulates the temperature of the power storage device based on instructions from the processing device.

* * * * *